Sept. 1, 1953
P. H. LEPPONEN
2,650,851
AUTO BUMPER GUARD
Filed June 20, 1949
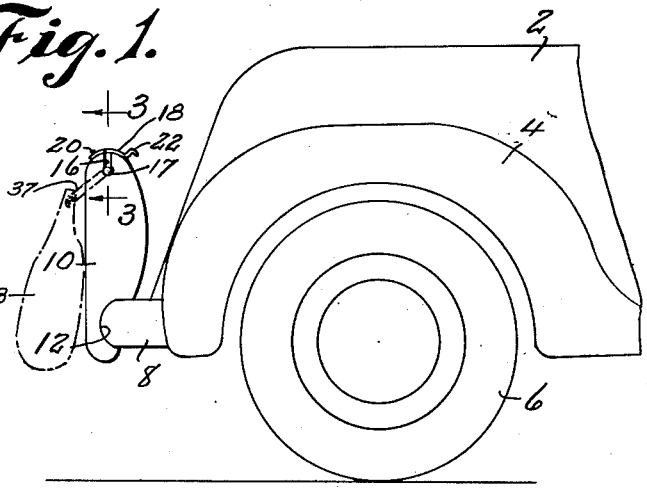
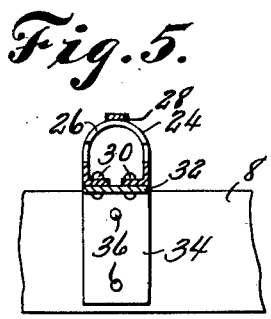
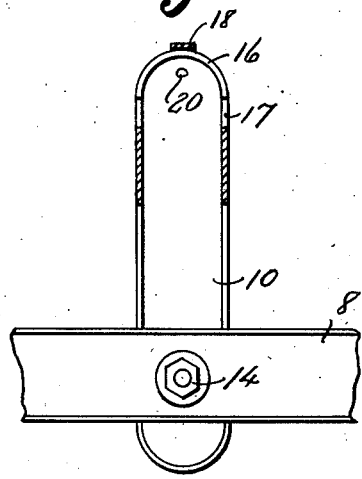
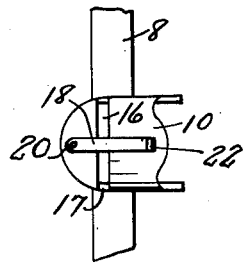
INVENTOR.
Peter H. Lepponen
BY Victor J. Evans & Co.
ATTORNEYS Patented Sept. 1, 1953

2,650,851

UNITED STATES PATENT OFFICE 2,650,851

AUTO BUMPER GUARD

Peter H. Lepponen, Walden, Colo.

Application June 20, 1949, Serial No. 100,288

3 Claims. (Cl. 293—69)

My present invention relates to an improved auto bumper support of the type especially designed and adapted to support a water bag by means of a rope tensioned by the support.

In carrying out my invention I utilize the conventional currently used auto bumper guard, or if such is not attached to or mounted on the bumper, then I provide a bumper supported bracket of the same design.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a partial side elevational view of an automobile showing the bumper guard fitted according to my invention.

Fig. 2 is a top plan view of the bumper guard.

Fig. 3 is a sectional view at line 3—3 of Fig. 1.

Fig. 4 is a side elevational view of a bracket attached to the bumper where the bumper has no guard.

Fig. 5 is a sectional view at line 5—5 of Fig. 4.

Referring now to the drawings wherein I have illustrated the present preferred embodiment of my invention, I have shown a portion of a conventional automobile including the hood 2, fender 4 and wheel 6. A bumper bar 8 concavo-convex in cross-section is suitably mounted on the vehicle frame and upon this bumper bar I illustrate the conventional guard 10 comprising the hollow vertically positioned element notched at 12 to fit the bar 8 and secured by bolt 14.

The upper portion of the guard is slotted as at 16 and the ends of the slot are enlarged into arcuate receptacles 17. The rope 37 of the water bag 38, shown in dotted lines Fig. 1, is placed in the slot and into the receptacles and conventionally knotted or provided with other means securing the ropes in the slot.

A spring latch 18 may be riveted to the guard as at 20 and formed with a handle 22.

In Figs. 4 and 5 I have shown a hollow hemispherical body 24 having a slot 26 and clip 28, secured as by rivets 30 to bracket arm 32 of bracket 34 secured by rivets 36 to the bumper bar 8.

From the above it will be apparent that the conventional bumper guard may be easily altered or modified according to my construction to receive and retain ropes secured to an auxiliary water bag frequently carried in automobiles for emergency use.

Having thus fully described my invention what I claim as new and desire to secure by Letters Patent is:

1. The combination with a vehicle bumper, of a vertically disposed guard above the bumper, said guard being concavo-convex in cross section, a closed rounded cap portion on the end of the guard extended above the bumper, said cap being provided in the upper surface thereof with a transverse slot having enlarged end portions to receive a rope, and a spring latch across the said slot.

2. The combination with a vehicle bumper, of a vertically disposed guard concavo-convex in cross section above the bumper, the upper end of the bumper being provided in the upper surface thereof with a vertical slot to receive a rope, and a spring latch across the said slot.

3. The combination with a vehicle bumper, of a vertically disposed guard concavo-convex in cross section above the bumper, the upper end of the guard being provided with a vertical slot having enlarged end portions to receive a rope, and a spring latch across the said slot.

PETER H. LEPPONEN.

References Cited in the file of this patent

UNITED STATES PATENTS

| Number | Name | Date |
| --- | --- | --- |
| 2,203,489 | Conwell | June 4, 1940 |
| 2,214,532 | Koch | Sept. 10, 1940 |
| 2,521,221 | Ivey | Sept. 5, 1950 |